E. J. Crane,
Cheese Press.
N°. 70,810. Patented Nov. 12, 1867.
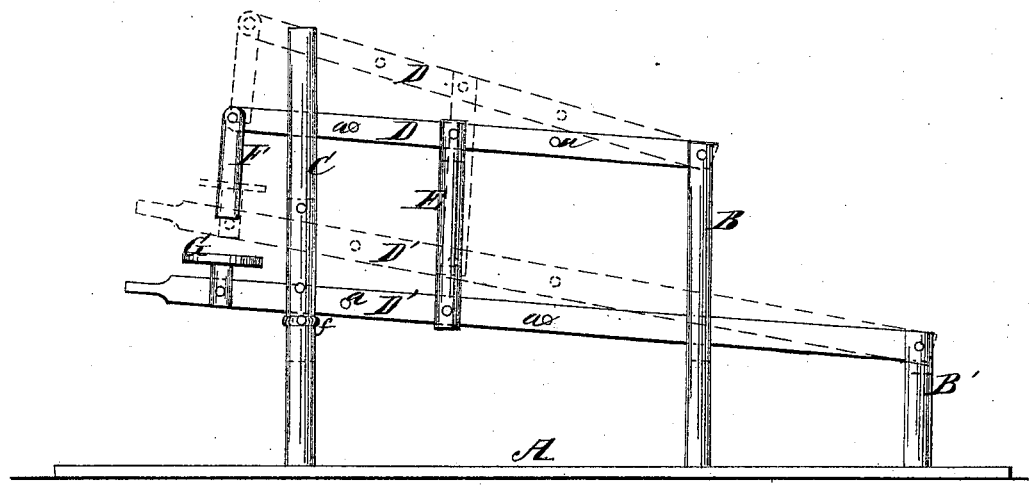
Witnesses:
Theo Tusche
J. A. Service
Inventor:
E. J. Crane
Per Munn
Attorneys

United States Patent Office.

E. J. CRANE, OF LA PORTE, INDIANA.

Letters Patent No. 70,810; dated November 12, 1867.

IMPROVED CHEESE-PRESS.

The Schedule referred to in these Letters Patent and making part of the same.

TO ALL WHOM IT MAY CONCERN:

Be it known that I, E. J. CRANE, of La Porte, in the county of La Porte, and State of Indiana, have invented a new and useful improvement in Cheese-Press; and I do hereby declare that the following is a full, clear, and exact description thereof, which will enable those skilled in the art to make and use the same, reference being had to the accompanying drawings, forming part of this specification.

This invention relates to a new and improved method of constructing cheese-presses, whereby the same are made self-acting; and the invention consists in arranging two levers with suitable supports in such a manner that the cheese presses itself when properly arranged upon its table, as hereinafter described.

The drawing represents a longitudinal elevation of the press, showing the parts of which it is composed, and the manner of their combination.

Similar letters of reference indicate corresponding parts.

A is the platform which supports the press. B B' are studs or posts, to which the levers are attached. C is a slotted stud or standard, in which the levers play up and down, forming a guide therefor, with holes through it for a guide or stop-pin to govern the descent of the levers. D D' represent the levers. E is a bar, which connects the two levers, and which is adjustable, so as to change the motion, and increase or diminish the power of the press, as may be desired. $a$ represents holes through the levers and bar for this purpose. F represents the pressing-stud, which is attached to the end of the lever D, either rigidly or by a pivot. G is the table for the cheese, which is attached to the lever D'. The levers are shown in two positions in the drawing. The red lines indicate their positions when the process of pressing commences. The black lines show their positions when the pressing is completed, or their positions after the lever D' strikes the guide-pin at $f$.

The levers being of different lengths, they move (as they are connected) at different rates of speed. The short lever approaches the other as they descend, and with a power which depends upon the position of the connecting-bar E.

The stud B is slotted, so that the lever D' passes through it, while the lever D is attached in the slot at its upper end.

Having thus described my invention, I claim as new, and desire to secure by Letters Patent—

The platform A, the studs B, B', and C, the connecting-bar E, the levers D D', the pressing-stud F, and the table G, arranged, combined, and operating substantially as shown and described for the purposes herein set forth.

E. J. CRANE.

Witnesses:
CHRLS. W. FRANCIS,
WILLIAM ANDREW.